July 9, 1963     J. E. BARROW     3,096,791
LEG STRUCTURE FOR METAL TABLES AND THE LIKE
Filed May 3, 1961
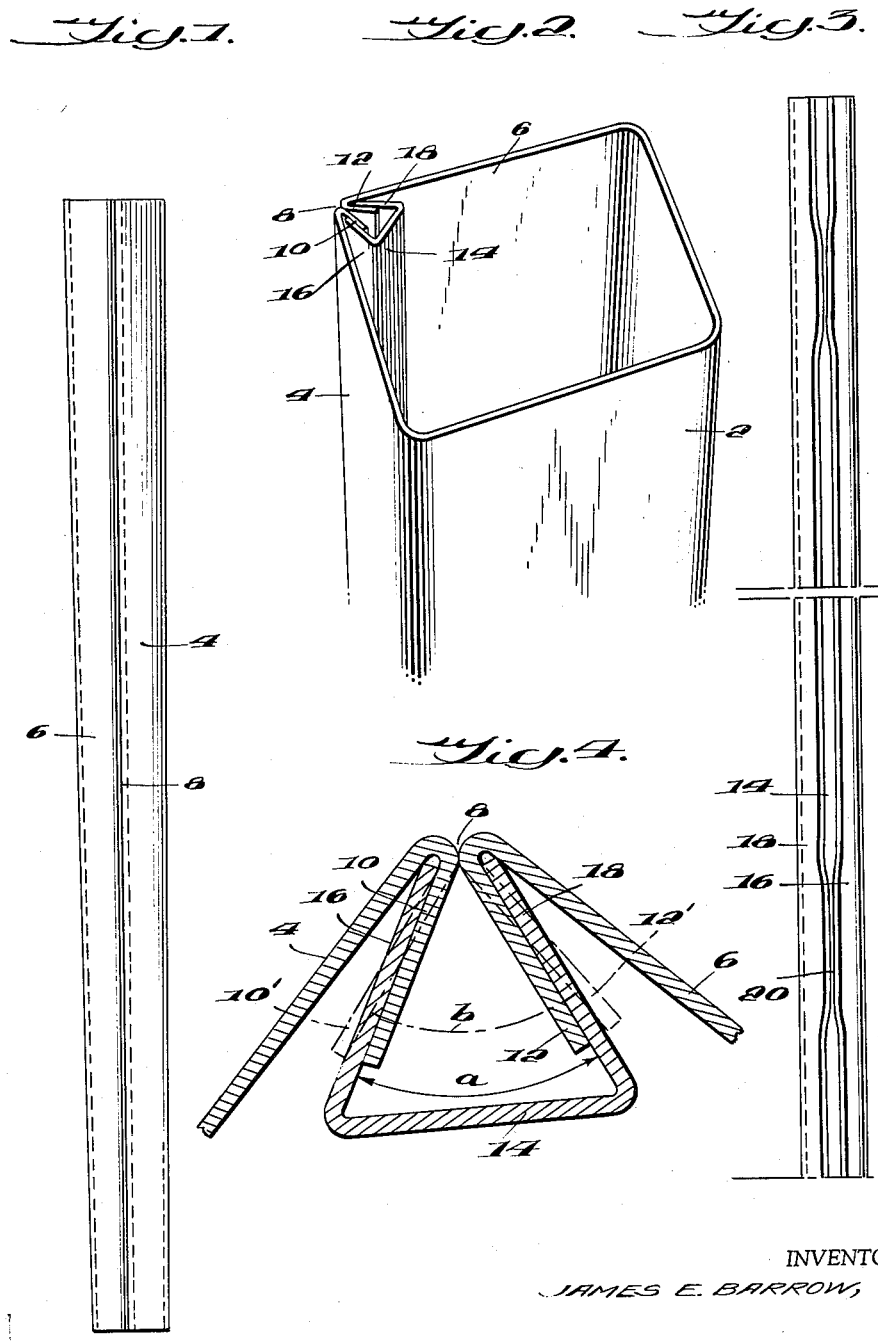
INVENTOR
JAMES E. BARROW

United States Patent Office 3,096,791
Patented July 9, 1963

3,096,791
LEG STRUCTURE FOR METAL TABLES AND THE LIKE
James E. Barrow, 70 Emerald Drive, Jonesboro, Ga.
Filed May 3, 1961, Ser. No. 107,583
4 Claims. (Cl. 138—151)

The invention relates to legs for metal furniture and more particularly to metal table legs.

Table legs for metal furniture are usually made by bending a strip of sheet metal into solid form and welding longitudinally, ordinarily along a corner. Such welding requires special equipment and skilled labor and is therefore expensive. This results in a seam which must be ground off to make it smooth. Even after grinding, however, the corner often has rough spots which are likely to catch clothing, especially stockings, and thereby cause damage. Also, it is difficult to obtain proper alignment of the meeting edges during the welding and to maintain it afterwards, and any flaw in the weld will weaken the leg.

The primary object of the present invention is to produce a leg for tables or the like which avoids the disadvantages of the conventional legs.

A further object of the invention is to provide a leg which is less expensive to manufacture, stronger and less subject to breakage than the usual legs.

Another object of the invention is to provide a leg which does not require welding and grinding and which has a smooth joint at the corner between accurately aligned edges.

In general, the invention comprises a strip of sheet metal bent into a closed tube-like or hollow form with two substantially plane surfaces meeting at a substantial angle at one corner. The tip parts of the edges at the corner are turned inwardly and diverge from each other and from the respective edge portions of the strip. A strip of metal bent into substantially triangular shape is driven lengthwise so as to engage over the tip parts and compress them towards each other.

Further objects and advantages of the invention will appear more fully from the following description especially when taken in conjunction with the accompanying drawings which form a part thereof.

In the drawings:

FIG. 1 shows in side elevation a table leg embodying the invention;

FIG. 2 is a perspective view on an enlarged scale of one end of such a leg;

FIG. 3 shows the holding strip; and

FIG. 4 is an enlarged cross-section on a larger scale than FIG. 2.

The leg is formed from a strip 2 of sheet metal bent into a closed or hollow cross-section and having two substantially plane sides 4 and 6 with edge portions adapted to meet at a corner, as at 8. The tip parts 10, 12 of the edge portions are bent inwardly into the hollow interior of the leg, normally occupying the positions shown in broken lines at 10', 12'.

The securing member is formed of a strip of sheet metal bent into substantially triangular form having a base 14 and legs 16, 18. The angle $a$ between legs 16, 18 is less than the normal angle $b$ between parts 10, 12. The securing member is, in assembly, applied to one end of the leg so as to engage with its legs over the parts 10, 12 and is then driven lengthwise of the leg to clamp the edge parts together at 8. The driving moves the parts 10, 12 inwardly towards each other to the positions shown in solid lines in FIG. 4, in which they press resiliently against the legs 16, 18, producing sufficient friction to hold the securing member firmly in position.

At spaced intervals, as at 20 (FIG. 3), the free edges of the legs 16, 18 are crimped towards each other. I have found that these spaced crimps are enough to ensure adequate friction to prevent accidental disassembly and proper alignment of the edges at the joint, while reducing the force necessary to drive the securing member into position.

It will be noted that legs 16, 18 are somewhat longer, in FIG. 4, than tips 10, 12, thus ensuring proper mating of the edges at 8.

While I have described herein some embodiments of my invention, I wish it to be understood that I do not intend to limit myself thereby except within the scope of the claims hereto or hereinafter appended.

I claim:

1. A metal furniture leg comprising a single sheet metal strip bent into a closed hollow cross-section including two substantially plane edge portions forming a substantial angle with each other and meeting at a corner, the tip parts of said edge portions being bent inwardly into the interior of the hollow cross-section and diverging at said corner from each other and from the respective plane edge portions, and a securing member comprising an elongated securing strip bent into substantially triangular cross-section and having a base and converging legs extending therefrom, said legs engaging over said tip parts, the angle between the legs being less than the normal angle between the tip parts whereby the tip parts are displaced towards each other to maintain substantial pressure between them and the legs, said legs and tip parts being in contact over substantially the whole of their facing surfaces.

2. A structure as claimed in claim 1 in which the legs are longer than the tip parts.

3. A structure as claimed in claim 2 in which the securing strip has the free edges of the legs crimped against each other at spaced points.

4. A structure as claimed in claim 1 in which the securing strip has the free edges of the legs crimped against each other at spaced points.

References Cited in the file of this patent

UNITED STATES PATENTS

| | | |
|---|---|---|
| 758,331 | Ohnstrand | Apr. 26, 1904 |
| 1,129,040 | McClure | Feb. 16, 1915 |
| 1,725,244 | Bareham | Aug. 20, 1929 |
| 1,918,570 | Sheras | July 18, 1933 |
| 2,047,346 | Weston | July 14, 1936 |
| 2,274,553 | Elinke | Feb. 24, 1942 |
| 2,406,315 | Blocher | Aug. 27, 1946 |
| 2,859,804 | Healy | Nov. 11, 1958 |
| 2,875,866 | Hess | Mar. 3, 1959 |